United States Patent
Lee

(10) Patent No.: US 7,868,502 B2
(45) Date of Patent: Jan. 11, 2011

(54) FAN MOTOR, BLDC MOTOR, AND ROTOR FOR THE BLDC MOTOR

(75) Inventor: Kyung Hoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/354,894

(22) Filed: Jan. 16, 2009

(65) Prior Publication Data

US 2009/0184597 A1     Jul. 23, 2009

(30) Foreign Application Priority Data

Jan. 22, 2008   (KR)   .................. 10-2008-0006665
Jan. 22, 2008   (KR)   .................. 10-2008-0006666
Jul. 4, 2008    (KR)   .................. 10-2008-0065043

(51) Int. Cl.
   *H02K 21/16*   (2006.01)
(52) U.S. Cl. ................. 310/156.56; 310/156.53; 310/156.57; 310/156.58; 310/156.48
(58) Field of Classification Search ................. 310/156.01–156.84
   See application file for complete search history.

(56) References Cited

U.S. PATENT DOCUMENTS

| | | | |
|---|---|---|---|
| 6,946,766 B2 | 9/2005 | Gary et al. | |
| 7,105,971 B2 * | 9/2006 | Asai et al. | 310/156.53 |
| 7,768,172 B2 * | 8/2010 | Takahata et al. | 310/156.57 |
| 2002/0171311 A1 * | 11/2002 | Fujiwara et al. | 310/184 |
| 2004/0145263 A1 * | 7/2004 | Kojima et al. | 310/156.23 |
| 2005/0040723 A1 * | 2/2005 | Asai et al. | 310/156.53 |
| 2006/0208593 A1 * | 9/2006 | Park et al. | 310/156.53 |
| 2007/0126304 A1 * | 6/2007 | Ito et al. | 310/156.53 |
| 2007/0152527 A1 * | 7/2007 | Yura et al. | 310/156.53 |
| 2007/0252468 A1 * | 11/2007 | Lee | 310/156.53 |
| 2007/0257576 A1 * | 11/2007 | Adaniya et al. | 310/156.53 |
| 2008/0169717 A1 * | 7/2008 | Takashima et al. | 310/114 |
| 2009/0140592 A1 * | 6/2009 | Rahman et al. | 310/156.53 |
| 2009/0140593 A1 * | 6/2009 | Kaiser et al. | 310/156.53 |
| 2009/0212652 A1 * | 8/2009 | Nakamasu et al. | 310/156.53 |
| 2009/0230803 A1 * | 9/2009 | Nakayama et al. | 310/156.56 |
| 2009/0236923 A1 * | 9/2009 | Sakai et al. | 310/156.43 |

* cited by examiner

*Primary Examiner*—Quyen Leung
*Assistant Examiner*—Terrance Kenerly
(74) *Attorney, Agent, or Firm*—Birch, Stewart, Kolasch & Birch, LLP

(57) ABSTRACT

A BLDC motor is provided. The BLDC motor includes a stator having a plurality of teeth formed at an inside thereof, a plurality of coils, each of the plurality of coils being wound around a corresponding tooth of the stator, a rotor located at the inside of the stator, a plurality of magnets located at an edge portion of the rotor, a plurality of magnet placement portions located on the rotor, each magnet placement portion having a first and second barrier formed at opposite ends of the magnet placement portion, the first barrier and second barrier of adjacent magnet placement portions being separated by a gap portion, each of the plurality of magnets being inserted into a corresponding magnet placement portion, and at least one of the gap portions includes a third barrier located therein. A rotor and fan motor including a plurality of barriers formed on the rotor are also provided.

24 Claims, 10 Drawing Sheets

FAN MOTOR, BLDC MOTOR, AND ROTOR FOR THE BLDC MOTOR

CROSS-REFERENCE TO RELATED APPLICATIONS

The present application claims priority to Korean Patent Application No. 10-2008-0065043, filed on Jul. 4, 2008, Korean Patent Application No. 10-2008-0006666, filed on Jan. 22, 2008, and Korean Patent Application No. 10-2008-0006665, filed on Jan. 22, 2008, which are all hereby incorporated by reference in their entireties.

BACKGROUND OF THE INVENTION

1. Field of the Invention

The present disclosure relates generally to a fan motor, a brushless direct current (BLDC) motor, and a rotor for the BLDC motor.

2. Description of Related Art

BLDC motors are typically brushless motors that have a stator and a rotor mounted inside the stator. Generally the stator includes a plurality of salient poles and coils wound therearound. The rotor includes one or more magnets installed thereon.

Among BLDC motors, an internal permanent magnet (IPM) BLDC motor is a motor that has a magnet installed inside the rotor. Depending on an installation position of the magnet and a shape of the rotor through which lines of a magnetic field of the magnet pass, a back electromotive force (EMF) coefficient and a cogging torque significantly vary.

The back EMF is a factor in evaluating performance of the BLDC motor, and a factor in evaluating a torque component due to magnetic force generated by the magnet. The cogging torque is an amount of torque generated when the rotor moves to an equilibrium state where a magnetic energy is minimal in a mutual relation of the magnet and the stator, regardless of a current. The cogging torque is a factor that generates vibration and noise during the rotation of the rotor.

Various methods have been tried to provide a BLDC motor that is configured to generate a large torque such that loss of the back EMF coefficient can be reduced to the maximum, and to make the cogging torque as small as possible in order to reduce vibration and noise generated during the rotation of the BLDC motor. However, the various methods according to the related art either cannot obtain sufficient torque, or generate too much vibration and noise.

BRIEF SUMMARY OF THE INVENTION

According to principles of this invention, a fan motor, a BLDC motor, and a rotor for the BLDC motor are provided which can reduce a cogging torque and a torque ripple while providing a maximum back EMF coefficient, thereby achieving a smooth rotation of a rotor and obtaining a large torque. Also, according to principles of the present invention, various embodiments of a fan motor and a BLDC motor include a rotor that is easily produced, thereby resulting in an improved manufacturing yield, and in improved operation performance.

According to a first aspect of the present invention, a BLDC motor is provided. The BLDC motor includes a stator having a plurality of teeth formed at an inside thereof, a plurality of coils, each of the plurality of coils being wound around a corresponding tooth of the stator, a rotor located at the inside of the stator, a plurality of magnets located at an edge portion of the rotor, a plurality of magnet placement portions located on the rotor, each magnet placement portion having a first and second barrier formed at opposite ends of the magnet placement portion, the first barrier and second barrier of adjacent magnet placement portions being separated by a gap portion, each of the plurality of magnets being inserted into a corresponding magnet placement portion, and wherein at least one of the gap portions includes a third barrier located therein.

According to another aspect of the present invention, a rotor for a BLDC motor having a plurality of magnet placement portions for receiving magnets inserted therein is provided. The rotor includes a first barrier and a second barrier formed at opposite ends of each of the plurality of magnet placement portions, the first barrier and second barrier of adjacent magnet placement portions being separated by a gap portion, at least one third barrier formed on a q-axis of a rotating coordinate system, the q-axis passing through the gap portion of adjacent magnet placement portions, and a recessed portion formed at an outer periphery of the rotor adjacent a position where the third barrier is formed.

According to yet another aspect of the present invention, a fan motor is provided. The fan motor includes a case, a stator having a plurality of teeth formed at an inside thereof, a plurality of coils, each of the plurality of coils being wound around a corresponding tooth of the stator, and a rotor spaced at an inside of the stator. The rotor includes a rotating shaft, a plurality of plate members stacked in a length direction of the rotating shaft, a plurality of magnets inserted into edge portions of the plate members, a plurality of magnet placement portions located on the rotor, each magnet placement portion having a first and second barrier formed at opposite ends of the magnet placement portion, the first barrier and second barrier of adjacent magnet placement portions being separated by a gap portion, each of the plurality of magnets being inserted into a corresponding magnet placement portion, and wherein at least one of the gap portions includes a third barrier located therein.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to the embodiments of the present disclosure, examples of which are illustrated in the accompanying drawings.

Figure 1:
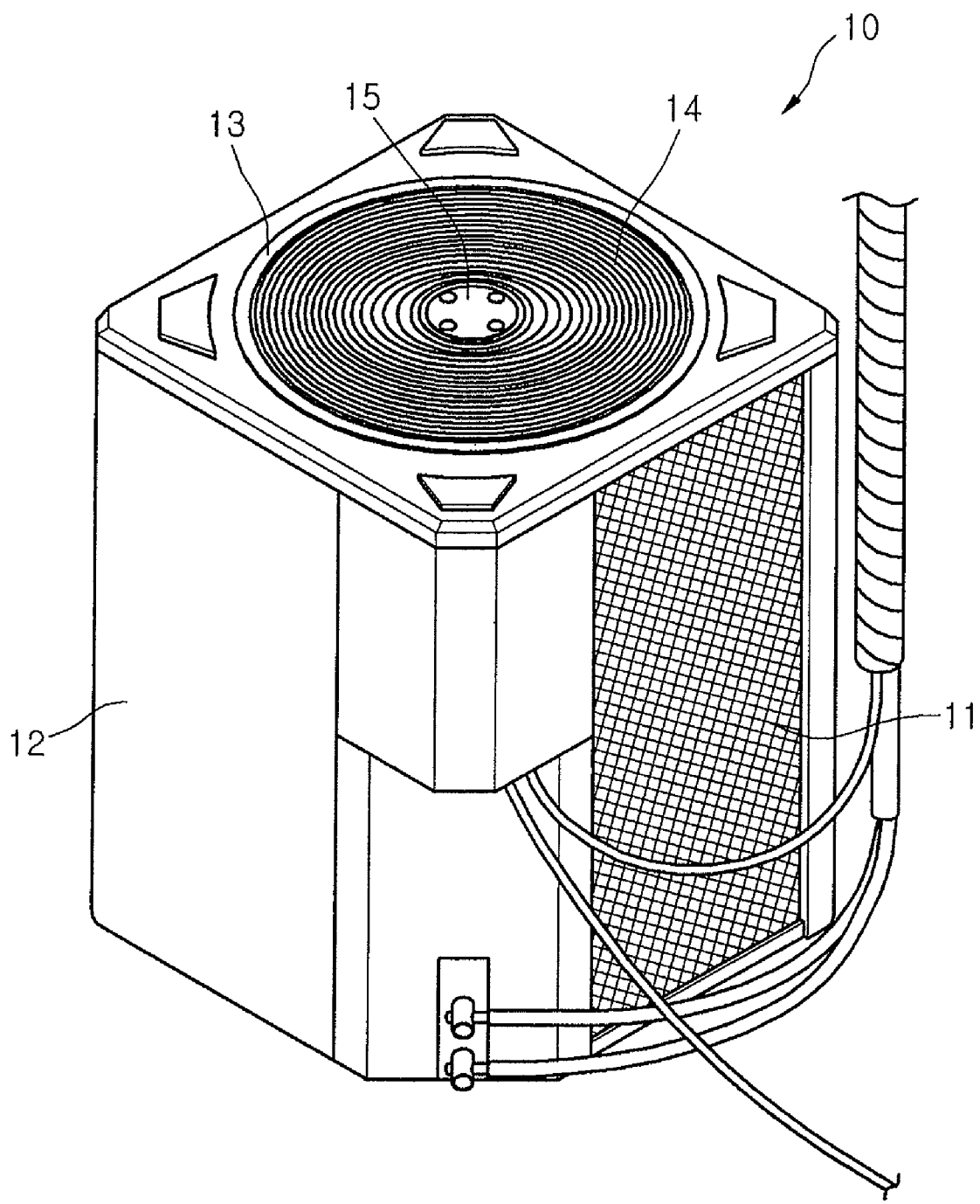
FIG. 1 is a perspective view of an outdoor unit having a fan motor according to an exemplary embodiment is provided.
Figure 2:
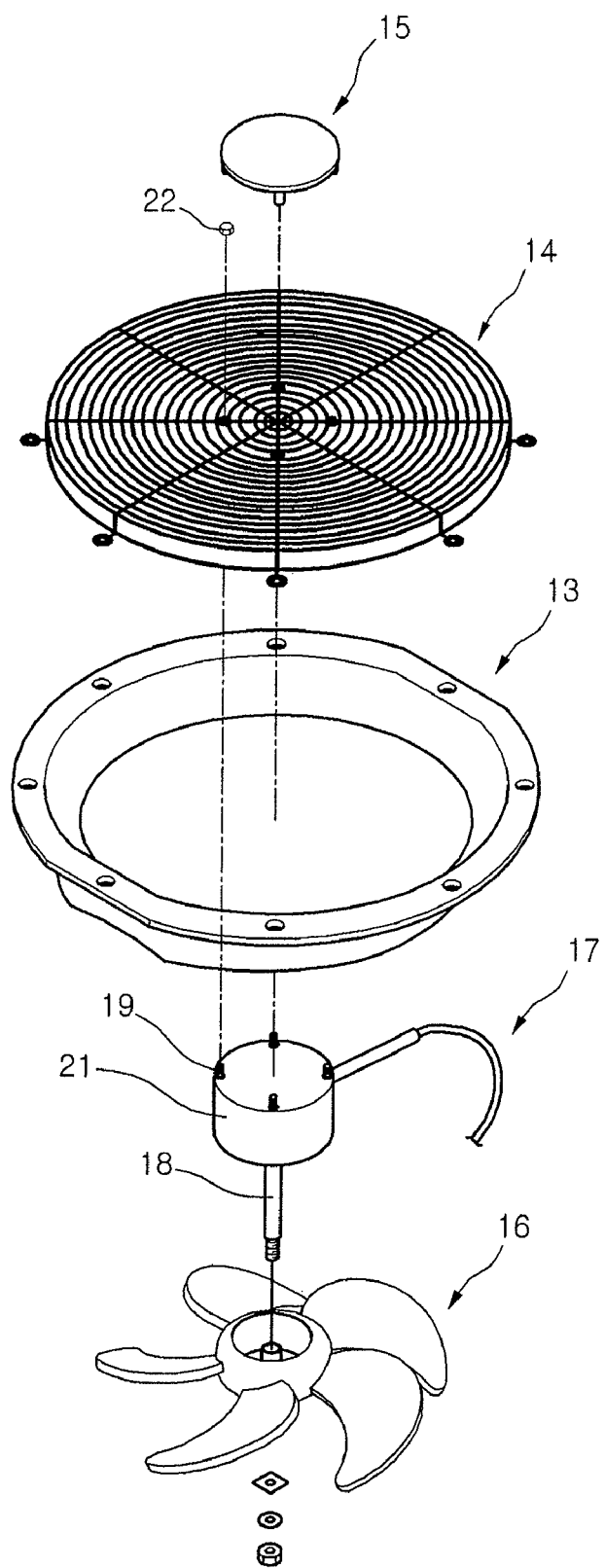
FIG. 2 is a partial exploded perspective view of the internal parts of the outdoor unit of FIG. 1.

FIG. 1 is a perspective view of an outdoor unit to which a fan motor according to an exemplary embodiment of the present invention is applicable, and FIG. 2 is a partial exploded perspective view of internal parts of the outdoor unit of FIG. 1. In the outdoor unit of FIG. 2, other parts such as a heat exchanger are not shown. Referring to FIGS. 1 and 2, an outdoor unit 10 includes an outdoor unit case 12 defining an outer frame, an outdoor heat exchanger 11 where heat exchange is performed, a top cover 13 for guiding flow of air exhausted from the top of the outdoor unit case 12, and a compressor (not shown) compressing a coolant. A fan motor 17 and a fan 16 are further provided inside the outdoor unit 10 to create a forced wind tunnel inside the outdoor unit. The top cover 13 has an approximately circular frame. A vertical circular exhaust hole is formed inside the top cover 13. An exhaust grille 14 is provided on the top cover 13. The exhaust grille 14 may be formed by a plurality of wires that are intersected circumferentially and radially or coupled in other forms.

A fan motor 17 is fixed downward from the center portion of the exhaust grille 14. In this exemplary embodiment, fixing bolts 19 are located at an upper portion of the fan motor 17 and connected to the fan motor 17 to form one body. The fan motor 17 may be fixed to the exhaust grille 14 by coupling fixing nuts 22 to the fixing bolts 19. That is, after the fixing bolt 19 passes through the exhaust grille 14, the fan motor 17 is fixed to the exhaust grille 14 by coupling the fixing nut 22 to the fixing bolt 19 from the upward direction. The fan motor 17 may be coupled to the outdoor unit in other coupling methods. The fan motor 17 receives an external power to generate a torque.

A blower fan 16 is provided under the fan motor 17. The blower fan 16 is rotated by a torque transferred by a rotating shaft 18 of the fan motor 17, and causes air inside the outdoor unit 10 to be exhausted upward through the exhaust grille 14. A motor cap 15 having a predetermined size is further provided on the upper center portion of the exhaust grille 14. The motor cap 15 has a circular shape corresponding to the top surface of the fan motor 17 and prevents rainwater from being dropped on the fan motor 17.

A BLDC motor is installed inside a fan motor case 21 defining an outer frame of the fan motor 17. The BLDC motor will be described below in more detail.

Figure 3:
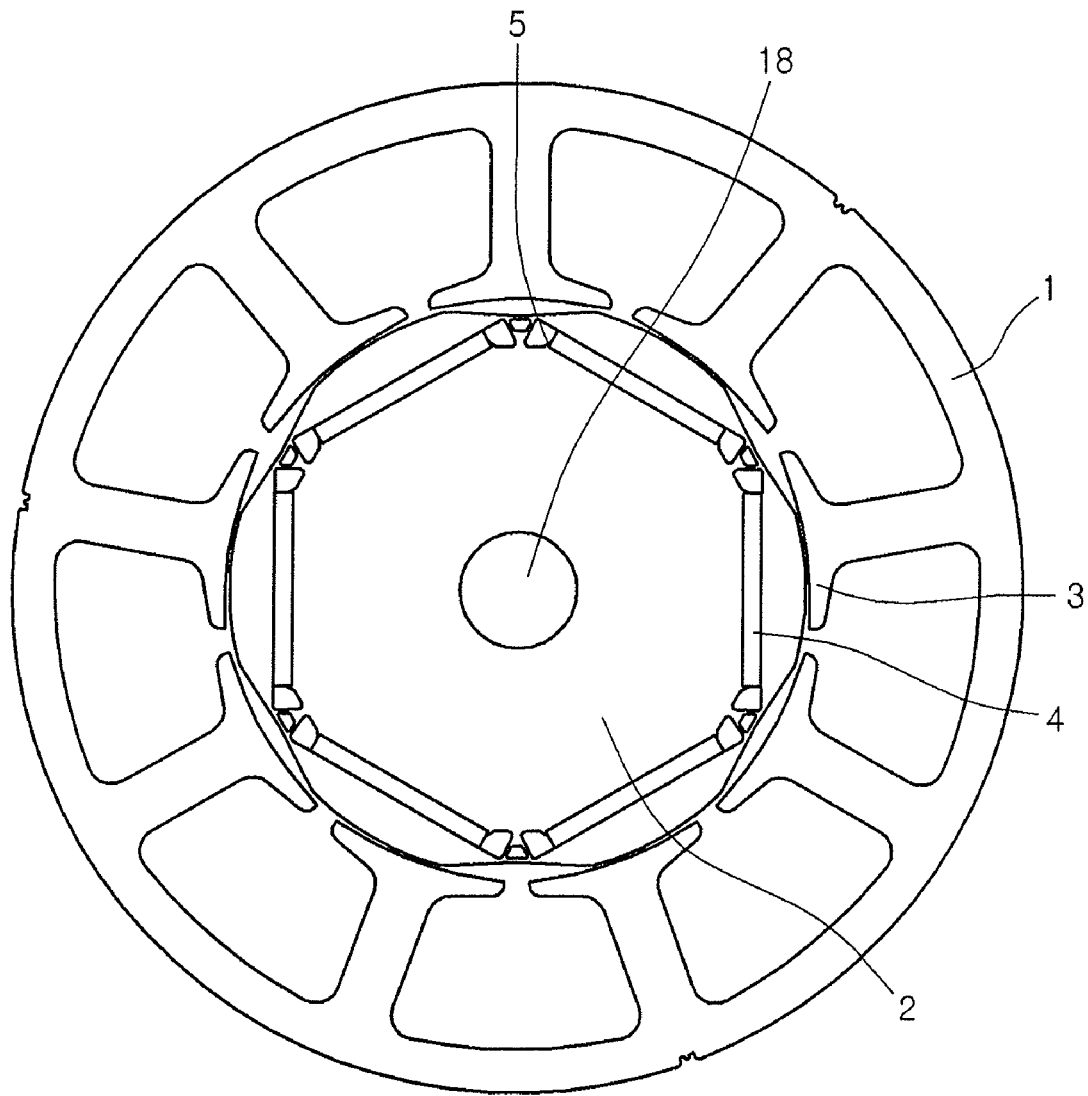
FIG. 3 is a schematic view of a BLDC motor according to an exemplary embodiment of the present invention.

FIG. 3 is a schematic view of a BLDC motor according to an exemplary embodiment of the present invention. Referring to FIG. 3, the BLDC according to this exemplary embodiment includes a stator 1 and a rotor 2 disposed inside the stator 1. The stator 1 includes a plurality of teeth 3 around which a coil is wound (not shown). A plurality of magnets 4 are fixed corresponding to the poles at an edge portion of the rotor 2. The rotor 2 may be inserted in a state that a plurality of plates is aligned along the rotating shaft 18 of the fan motor 17 in an upward and downward direction. Each of the magnets 4 is inserted in a magnet placement portion 6 (shown in FIG. 6) that perforates the rotor 2. A position of each magnet 4 is fixed to a magnet fixing portion formed on both ends of the magnet placement portion 6. In order to provide a strong magnetic flux, each of the magnets 4 may be Nd magnets. The rotating shaft 18 is inserted in the center portion of the rotor 2 to transfer the torque of the rotor 2 to the blower fan 16.

Figure 4:
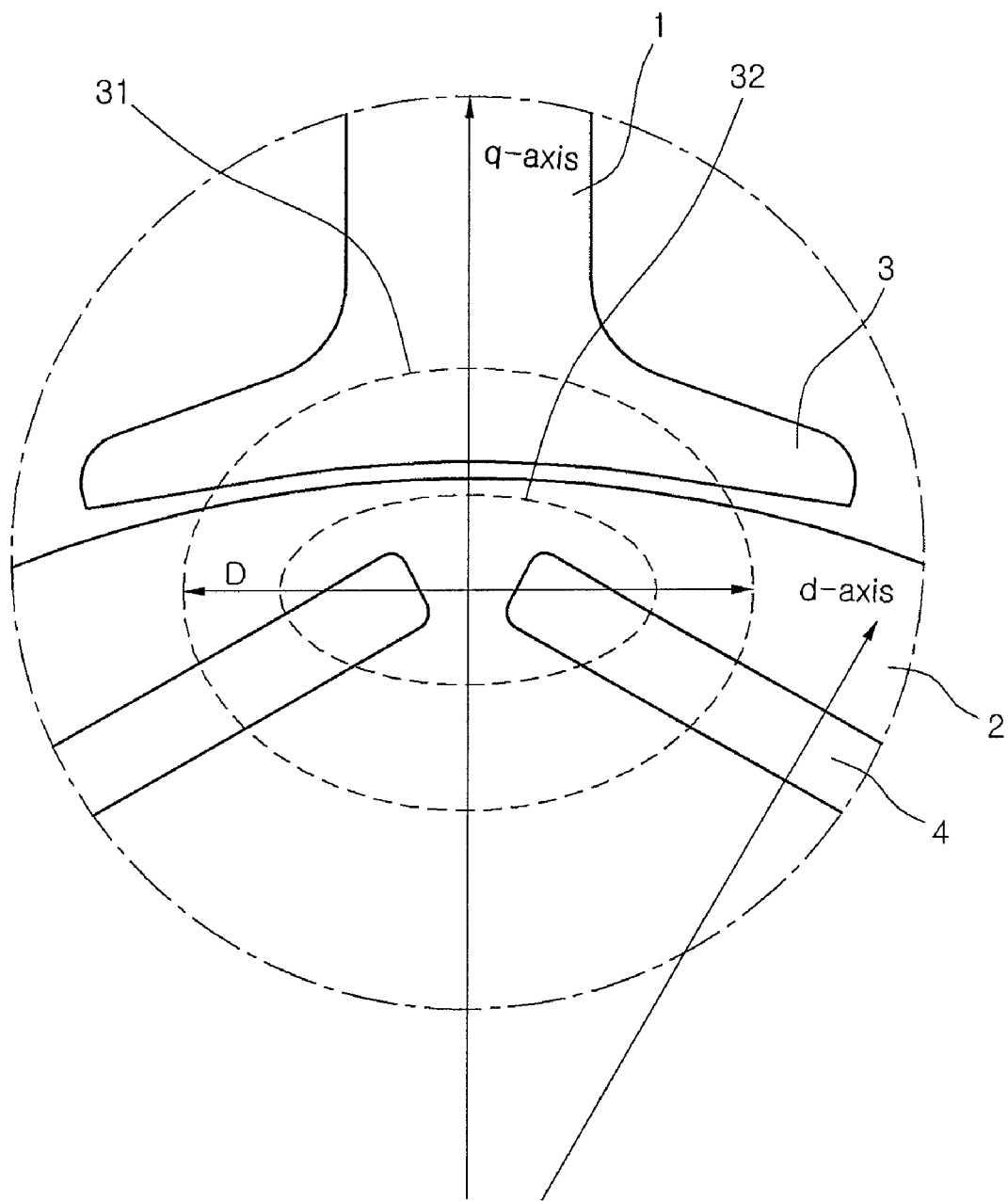
FIG. 4 is a schematic view of a magnetic flux state in an arrangement relation of a rotor and a stator.

In this exemplary embodiment, the cogging torque can be minimized, without loss of the back EMF coefficient, by improving the shape of the rotor 2. Consideration for achieving the above-described purposes will be described with reference to FIG. 4 which shows an arrangement relation of the stator and the rotor. FIG. 4 is a view for explaining the arrangement relation of the rotor and the stator. The arrangement relation of FIG. 4 is complementarily used for explaining the exemplary embodiment, and such a configuration is not essential to the present invention.

Referring to FIG. 4, a state where a pair of magnets 4 are aligned with one of the teeth 3 in a region where the magnets 4 face each other is a state where the rotor receives a strong torque; such a rotated state and position can be defined as a q-axis of a rotating coordinate system. And a state where one magnet 4 is aligned with the one of the teeth 3 is a state where the rotor 2 is stopped; such a rotated state and position can be defined as a d-axis of a rotating coordinate system.

Meanwhile, according to the arrangement state of FIG. 4, a magnetic flux is formed by a pair of adjacent magnets 4. The magnetic flux may be classified into an effective magnetic flux 31, which contributes to generating an electromagnetic force while passing through the teeth 3, and a leakage magnetic flux 32, which does not contribute to generating an electromagnetic force because it does not pass through the teeth 3. Because the leakage magnetic flux 32 does not contribute to a rotation force of a motor, that is, a torque of the motor, it is desirable to reduce the amount leakage magnetic flux as much as possible. This is because the back EMF force determining the motor torque is proportional to a variation rate of the effective magnetic flux over time.

As described above, both the effective magnetic flux 31 and the leakage magnetic flux 32 are generated when the separated magnets facing each other are paired. However, only the portion of the effective leakage magnetic flux 31 that passes through each of the teeth 3 contributes to the motor torque. In particular, the magnet flux passing through a lower side with respect to the center position of any one magnet end portion (i.e., a side near to the center of the rotor when viewed from the center position of the magnet end portion) does not pass through each of the teeth 3 and consequently does not have a great influence on the motor torque. However, the magnet flux passing through an upper side with respect to the center position of any one magnet end portion (i.e., a side far from the center of the rotor when viewed from the center position of the magnet end portion) passes through each of the teeth 3 and contributes to the motor torque. In this case, it is only a portion of the effective magnetic flux 31 that contributes to the motor torque because the leakage magnetic flux 32 does not pass through the teeth 3, but only passes through the rotor 2.

Also, in order to reduce the cogging torque, a diameter D of the effective magnetic flux must be minimized. This is because the cogging torque is related to the variation of a magnetic energy according to a variation of a rotation angle and the cogging torque increases as a variation rate of a magnetic flux increases.

Figure 5:
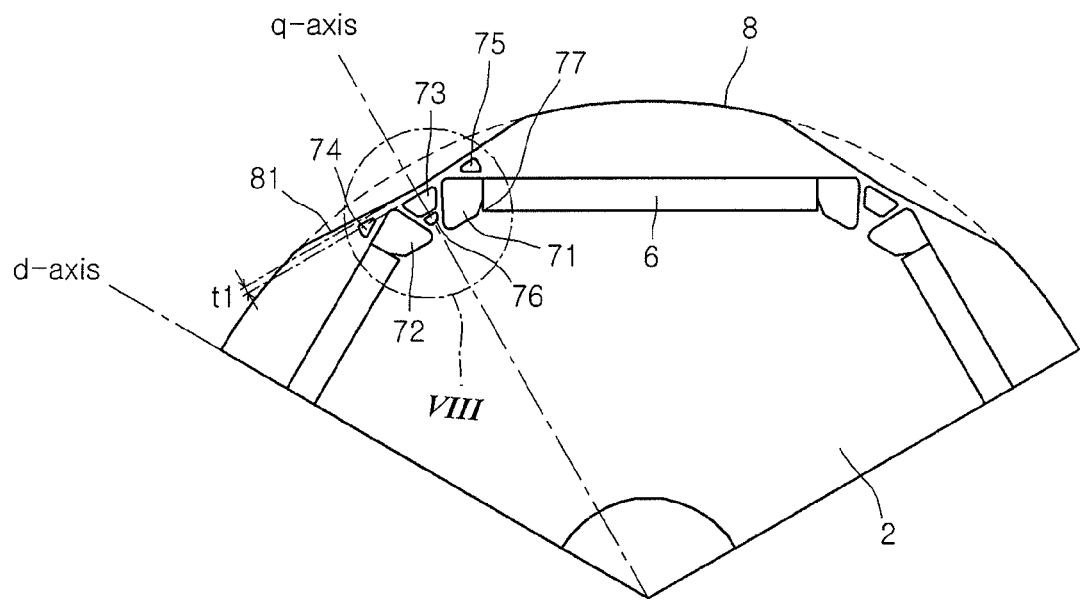
FIG. 5 is a partial plan view of a rotor according to an exemplary embodiment of the present invention.

The structures of an exemplary embodiment of the BLDC motor and the rotor thereof will be described in more detail with reference to FIG. 5, which is a partial plan view of the rotor according to the exemplary embodiment. Referring to FIG. 5, in order to reduce the loss of the back EMF coefficient, a recessed portion 81 is formed at an outer periphery 8 of the rotor in a contact region of a pair of adjacent magnets 4, that is, the q-axis. The recessed portions 81 may be formed by chamfering the edge portion of the rotor 2 to form a straight edge such that the position on the q-axis is recessed deepest and the recessed depth decreases as it goes away from the q-axis. As a result, an air gap between the stator and the rotor is largest at the q-axis, thereby reducing the leakage magnetic flux.

Also, by providing the recessed portion 81 to form a straight edge, the cogging torque is reduced. Specifically, if the recessed portion 81 were formed to have a curved edge, the air gap may increase, but the diameter D of the effective magnetic flux 31 would also increase, resulting in a greater cogging torque.

As shown in FIG. 5, the magnet placement portion 6, which receives magnet 4, has portions that extend beyond both sides of the magnet 4. The extending portions provide a barrier where the magnetic flux does not pass. A first barrier 71 and a second barrier 72 are arranged to face each other in order to minimize the leakage magnetic flux. Protrusions 77 that serve as magnet fixing portion are formed at a boundary between the magnet placement portion 6 and the first barrier 71 and a boundary between the magnet placement portion 6 and the second barrier 72. When the magnets 4 are inserted into the magnet placement portions 6, the protrusions 77 support the magnets 4.

Moreover, in order to further increase the effective magnetic flux, the widths of the first barrier 71 and the second barrier 72 are gradually widened as they extend away from the magnet 4. While the widths of the first barrier 71 and the second barrier 72 are gradually widened, the outer periphery of the first barrier 71 and the second barrier 72 remain substantially parallel with the outer periphery of the magnet placement portion, while the widths are further increased in the downward direction. The widths of the first barrier 71 and the second barrier 72 are widened in a downward direction at less than about 45 degrees with respect to the extending direction of the magnet 45. It is not desirable to have the widening degree be excessively large, because the diameter D of the effective magnetic flux increases. The leakage magnetic flux 32 can be further reduced by placing the magnet 4 as far as possible from the center of the rotor such that the magnet 4 is located closer to the stator. The diameter D of the effective magnetic flux can be reduced further by placing the adjacent magnets 4 closer to each other.

A third barrier 73 is formed between the first barrier 71 and the second barrier 72 to reduce the leakage magnetic flux 32 further. It is apparent that this results from the abrupt decrease in propagation of the magnetic flux through air inside the third barrier 73. Also, in order to further reduce an amount of the leakage magnetic flux 32, the third barrier 73 may be formed in an approximately trapezoidal shape. While the third barrier 73 may include air inside thereof to further reduce the leakage magnetic flux, a material having a lower magnetic permeability than air may be inserted inside the third barrier 73. For example, the inside of the third barrier 73 may be filled with a rubber. It is apparent that reducing the leakage magnetic flux by filling the third barrier 73 with the rubber can also be applied to other barriers.

As described above, an air gap is formed between the stator and the rotor. By allowing the air gap to extend to the third barrier 73, the leakage magnetic flux 32 is advantageously reduced. However, in this case, the stiffness of an edge portion of the rotor 2 is weakened. As a result, upon high-speed rotation of the rotor, the magnet 4 may be released or the rotor may be damaged, resulting in malfunction of the motor. Therefore, the recessed portion 81 is formed such that it does not contact the third barrier 73. That is, the third barrier 73 and the recessed portion 81 are formed to have a predetermined gap t1. As a result, thin ribs with a predetermined thickness t1 are provided between the third barrier 73 and the recessed portion 81 to reinforce the stiffness of the outer periphery of the rotor. It can be seen that the leakage magnetic flux is generated only between the gap of the ribs.

In addition to the third barrier 73, another barrier may be further provided in order to increase the effective magnetic flux. More specifically, a fourth barrier 74 and a fifth barrier 75 may be further formed between the first barrier 71 and the recessed portion 81 and between the second barrier 72 and the recessed portion 81, respectively. In this configuration, the effective magnetic flux 31 may be further increased because it is possible to prevent the magnetic flux from passing through the body of the rotor 2. The fourth barrier 74 and the fifth barrier 75 may be provided in a triangular shape according to their positions.

Furthermore, a sixth barrier 76 may be further formed at a lower portion of the third barrier 73. Due to the sixth barrier 76, an amount of the effective magnetic flux 31 can be even further increased.

Although the third barrier 73 may be provided as one body, as described above, it can also be provided in a separated shape in a left and right direction, or an up and down direction, or an inclined direction. In other words, although the third barrier 73 may be provided between a pair of adjacent magnets as one body, it can also be provided in a separated shape in order to reinforce the stiffness of the rotor or reduce the leakage magnetic flux.

Figure 6:
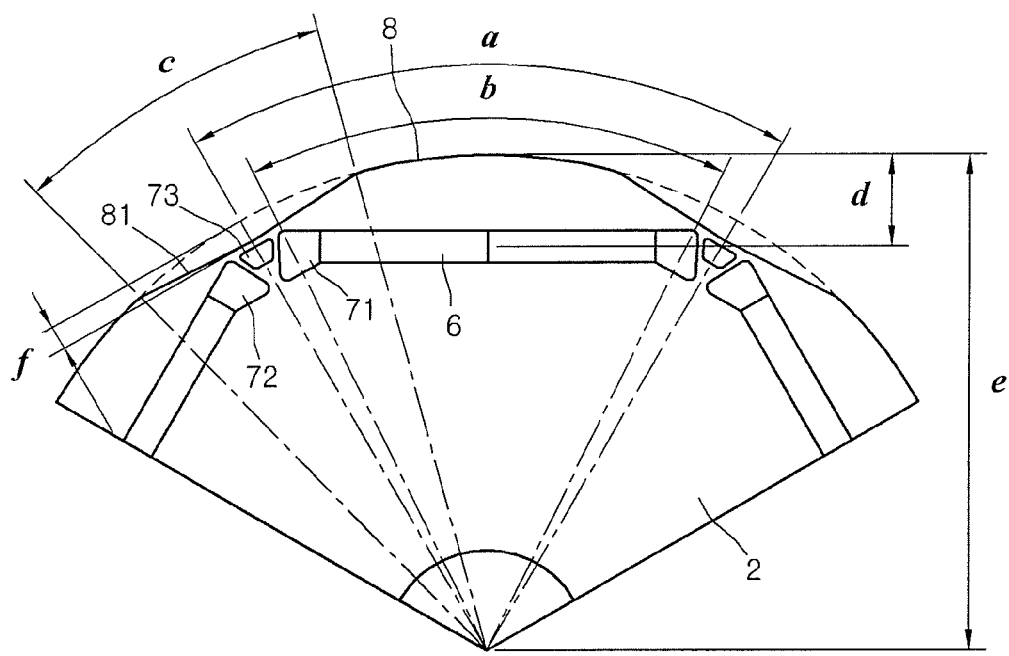
FIG. 6 is a partial plan view showing design factors of a rotor according to an exemplary embodiment of the present invention.

The present inventor proposed the above-described schematic structure and values for optimizing the shape of the rotor through a lot of experiments. FIG. 6 is a partial enlarged view for explaining design factors of the rotor according to the exemplary embodiment.

Referring to FIG. 6, "a" represents an angle of one pole of the rotor; "b" represents an angle occupied by the magnet 4 at one pole and an angle at which the first barrier and the second barrier are included; "c" represents an angle of the rotor that includes the recessed portion 81; "d" represents a distance from an outer periphery of the rotor 2 to the center of the magnet 4 with respect to the d-axis; "e" represents a distance from the outer periphery of the rotor 2 to the center of the rotor 2 on the d-axis; and "f" represents a maximum depth of the recessed portion 81 with respect to the q-axis. In these design factors, a pole efficiency defined by b/a, a value of d/e, and a value of f/e were adopted as main design factors of the rotor.

A physical meaning of the design factors will be described below. If the value of b/a is large, the magnet occupies a large gap and thus the magnetic flux is expected to increase. However, if the value of b/a is too large, the leakage magnetic flux increases and the motor torque in the relation to the teeth is not generated smoothly. The value of d/e represents the placement position of the magnet in a diameter direction of the rotor. As the value of d/e increases, the magnet gets closer to the teeth and thus the effective magnetic flux increases. However, as the value of d/e increases, a distance between the magnets becomes too far and the position of the magnet is limited in order for firm support of the magnet. As the value of f/e increases, the effective magnetic flux may increase, but the support of the magnet becomes difficult, as described above. Thus, the value of f/e is limited.

The desirable design factors were found from the experiments that focused on the above-described design factors. The desirable value of b/a is 0.85 to 0.89, more preferably 0.87. The desirable value of d/e is 0.16 to 0.20, more preferably 0.18. The desirable value of f/e is 0.041 to 0.051, more preferably 0.047. Meanwhile, according to another design factor, a desirable value of a*d/e*b is 0.1 to 0.5, more preferably 0.206. Also, an optimal value of (d*f/(e^2))×1000 is 5 to 15, more preferably 8.46. The above-described values are dimensionless values that have no unit. From the relation of the above-described values, a rough position relation of the first barrier, the second barrier, the third barrier, and a steel plate forming the rotor can be clearly understood. The ranges of the above-described optimal values are not a simple design modification. The ranges of the above-described optimal values were found by the present inventor through numerous experiments, and they are not simple numerical limitations.

The mutual relationship of the recessed portion 81 and the third barrier 73 most greatly influences the reduction of the leakage magnetic flux in the position relation to the teeth 3 of the stator. As described above, the effective magnetic flux influencing the motor torque is only the magnetic flux that passes through the teeth among the magnetic fluxes passing from the center position of the magnet end portion to a side far from the center of the rotor, while the magnetic flux that passes through the rotor among the magnetic fluxes passing from the center position of the magnet end portion to a side far from the center of the rotor becomes the leakage magnetic flux and has no influence on increasing the motor torque. Therefore, reducing the leakage magnetic flux has an influence on increasing the motor torque.

Figure 7:
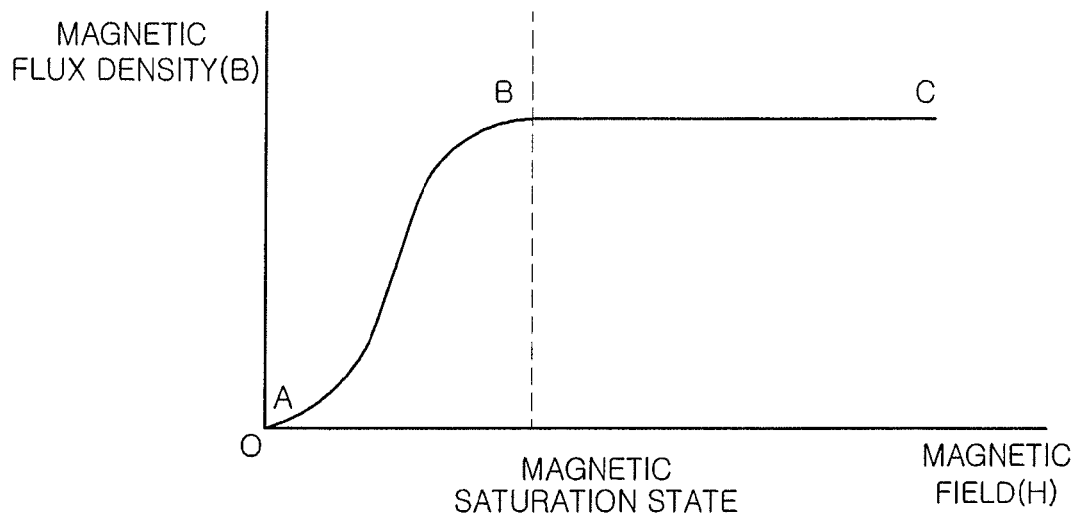
FIG. 7 is a magnetic saturation diagram.

To this end, the rotor region forming a gap between the recessed portion 81 and the third barrier 73 must be small, but within a range that the stiffness is maintained during the rotation motion of the rotor 2. In another aspect, on a B-H diagram (magnetic saturation diagram) which is dependent on the material of the rotor 2, the magnetic saturation may be generated at a gap between the recessed portion 81 and the third barrier 73 even at a weak magnetic field (H). In this way, the increase phenomenon of the magnetic field (H) passing through the gap between the recessed portion 81 and the third barrier 73 is removed and thus the leakage magnetic flux does not increase. FIG. 7 shows an example of a magnetic saturation curve.

In FIG. 7, a horizontal axis is a magnetic field (H), and a vertical axis is a magnetic flux density (B) generated at a plate member according to the magnetic field. In the magnetic saturation curve, if a magnetic field is applied to a steel plate forming the rotor 2, a magnetic flux density (B) generated from the rotor 2 increases during a period A-B. However, the magnetic flux density (B) reaches a magnetic saturation state at a point B, and the magnetic flux density generated from the rotor 2 is does not substantially increase any more even though the magnetic field becomes stronger. When the magnetic flux density reaches the point B in the magnetic saturation curve, it is said that the magnetic flux density reaches a magnetic saturation state. Such a phenomenon appears more clearly when the member is elongated in one direction. In case where one point of the elongated member is provided thinly to form a neck, the magnetic flux density is not increased any more if only the neck point is magnetic-saturated, even though other portions are not magnetic-saturated.

Referring again to FIG. 5, an amount of the magnetic flux passing through the gap between the recessed portion 81 and the third barrier 73 is further reduced by the magnetic saturation if only the portion where the thickness t1 between the recessed portion 81 and the third barrier 73 is made as small as possible. This can be achieved even though only the gap between the recessed portion 81 and the third barrier 73 is minimized.

However, if the gap between the recessed portion 81 and the third barrier 73 is too thin, it is difficult to form the rotor. This is because the rotor is generally formed from a plurality of stacked thin plate members and punching or other methods may form the recessed portions, and, if the gap between the recessed portion 81 and the third barrier 73 is too thin, the corresponding portion may be broken in the punching process. Also, due to the lower stiffness, the rotor may be damaged by impact during the high-speed rotation or the change in the rotating speed.

Figure 8:
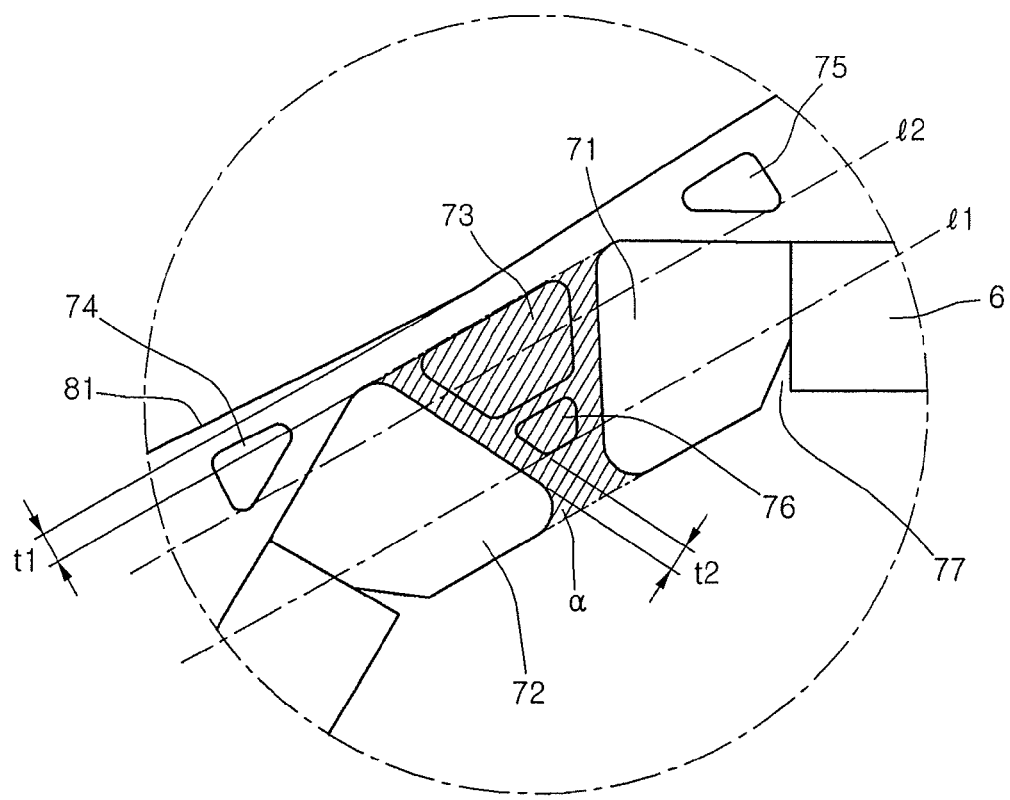
FIG. 8 is an enlarged view of a call-out VIII in FIG. 5.

A detailed structure of the rotor, which can solve the above problems, improve the motor torque, and reduce the cogging torque, is shown in FIG. 8. FIG. 8 is an enlarged view of the call-out VIII in FIG. 5. Referring to FIG. 8, the third barrier 73 is placed at the gap between the first barrier 71 and the second barrier 72. More specifically, the gap portion where the first barrier 71 and the second barrier 72 face each other is indicated by "α" in FIG. 8. The third barrier is placed only in the region "α", and does not extend outward. The third barrier 73 is placed far from the center of the rotor 2, and the first barrier 71 and the second barrier 72 are placed farther from the rotor 2. In this way, the gap between the first barrier 71 and the third barrier 73 and the gap t2 between the second barrier 72 and the third barrier 73 are farther reduced. Thus, the magnetic flux that passes around the recessed portion 81 and the third barrier 73 without passing through them is further reduced, and the leakage magnetic flux among the magnetic fluxes passing through a side far from the center of the rotor is reduced at the center position of the magnet end portion, thereby minimizing the leakage magnetic flux.

A geometrical center of the third barrier 73 formed at the gap portion between the first barrier 71 and the second barrier 72 is placed outside a virtual line l1 connecting the centers of the end portions of the pair of the magnets. In this way, the stiffness of the lower portion of the third barrier 73 can be reinforced, and defects in the processing of the rotor can be prevented. Also, among the magnetic fluxes passing through a side far from the center of the rotor, the leakage magnetic flux can be reduced at the center position of the magnet end portion.

When drawing a line parallel to the virtual line l1 connecting the centers of the end portions of the pair of the magnets facing each other, at least one virtual line l2 passes through at least three barriers (for example, the first barrier 71, the second barrier 72, and the third barrier 73) formed of a material different from the rotor. Consequently, among the magnetic fluxes passing through the side far from the center of the rotor at the center position of the magnet end portion, the flow of the magnetic flux passing through the leakage magnetic flux path is interrupted, thereby further reducing the motor torque.

The following description will be made to verify that the above-described embodiments are optimal, in comparison with a comparative example.

Comparative Example

Figure 9:
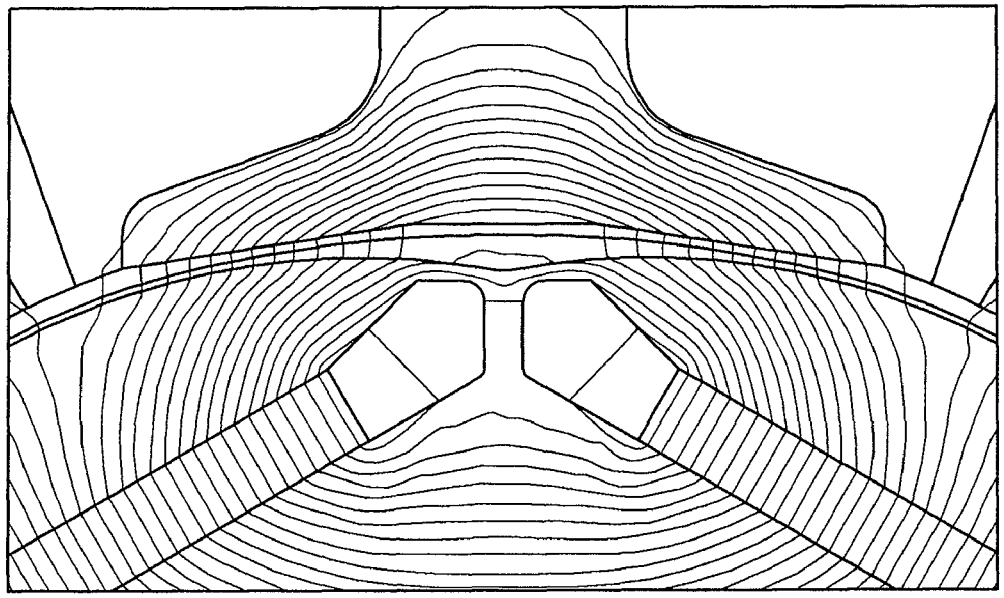
FIG. 9 is an enlarged sectional view of a rotor and a stator in an comparative example.
Figure 10:
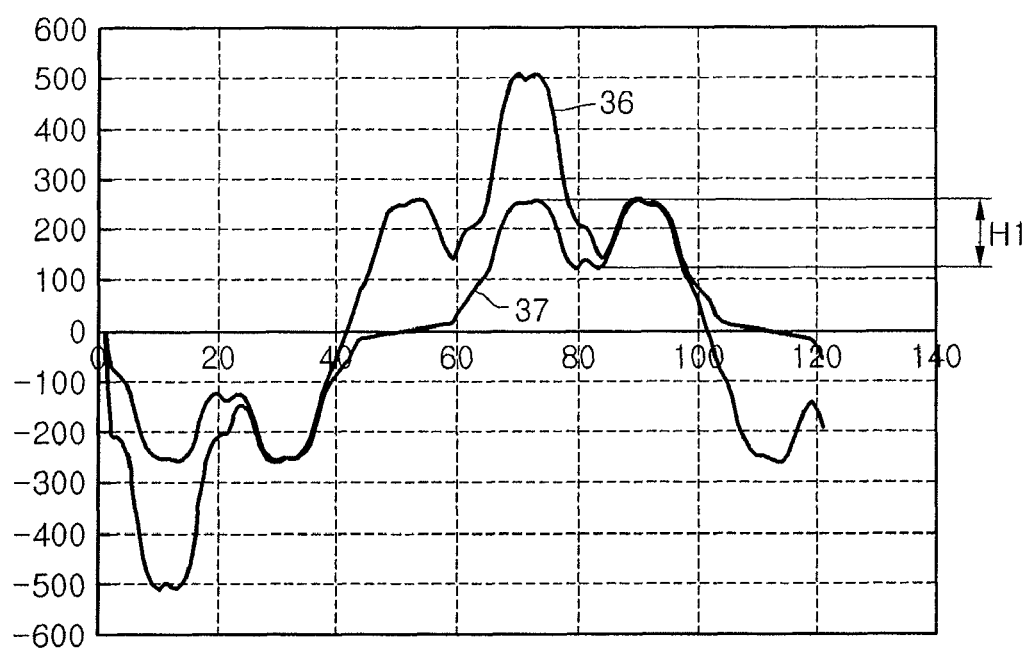
FIG. 10 is a back EMF diagram and a cogging torque diagram of the comparative example of FIG. 9.

FIG. 9 is a partial enlarged sectional view of a rotor and a stator of a comparative example proposed for verifying the effect of the exemplary embodiment. FIG. 10 is a back EMF diagram 36 and a cogging torque diagram 37 of the comparative example.

Referring to FIGS. 9 and 10, a recessed portion of the comparative example has a curved shape, and a barrier is widened as it goes toward both ends thereof, but the barrier is further widened toward an upper portion, that is, an outer periphery. A third barrier and other barriers are not provided. In this arrangement, an amount of cogging is represented by H1.

Exemplary Embodiment

Figure 11:
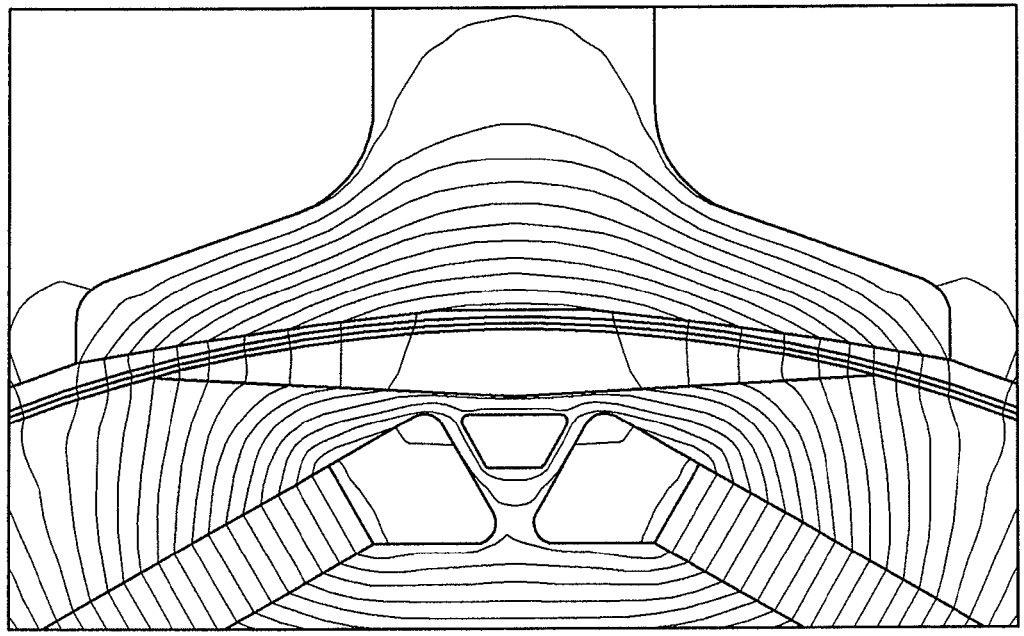
FIG. 11 is an enlarged sectional view of a rotor and a stator according to an exemplary embodiment of the present invention.
Figure 12:
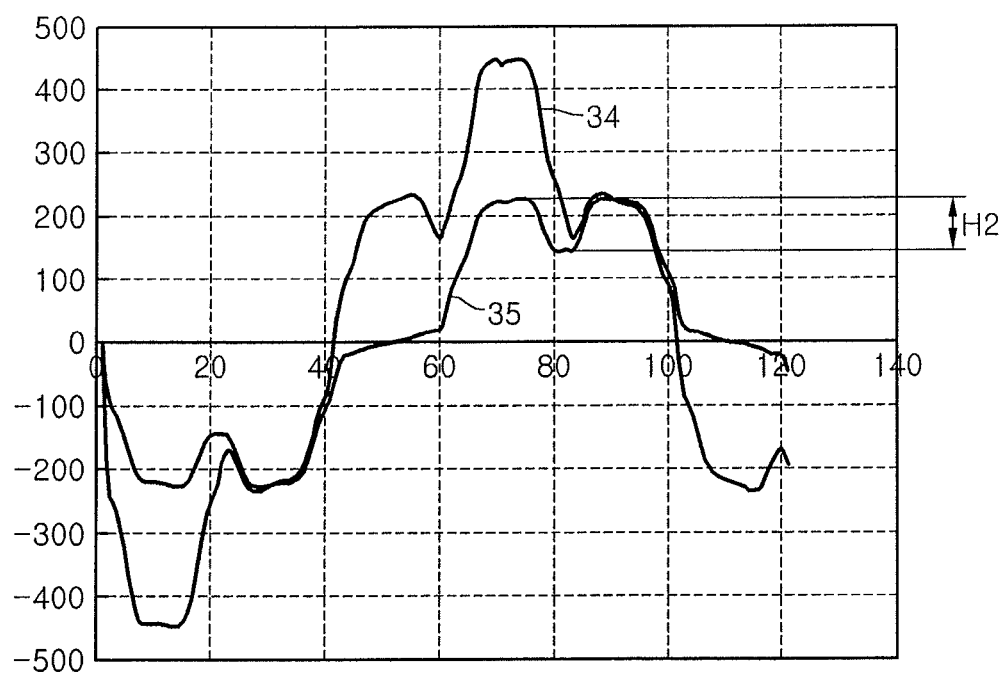
FIG. 12 is a back EMF diagram and a cogging torque diagram of the exemplary embodiment of FIG. 11.

FIG. 11 is an enlarged sectional view of the rotor and the stator according to the exemplary embodiment, in which the fourth, fifth and sixth barriers are omitted. FIG. 12 is a back EMF diagram 34 and a cogging torque diagram 35 of the exemplary embodiment. An amount of cogging is represented by H2.

It can be seen from FIG. 11 and FIG. 12 that an amount of cogging in the exemplary embodiment is reduced by about 40%, compared to the comparative example. The back EMF is a decreasing value at a peak value, but it rather increases in view of its integral value.

By providing a fan motor, a BLDC motor, and a rotor for the BLDC motor according to the exemplary embodiments, the back EMF coefficient increases and an amount of cogging torque generated is reduced. Furthermore, the degradation in the stiffness of the rotor can be prevented, thereby reducing a failure rate of the motor and improving productivity.

The BLDC motor, the rotor for the BLDC motor, and the fan motor using the previous exemplary embodiment may suffer a drawback in the configuration of the protrusions 77. More specifically, the protrusion 77 serving as the magnet fixing portion includes a peak point in order to support the magnet and increase the size of the first and second barriers 71 and 72. However, upon high-speed rotation of the rotor and variation of the rotating speed, impact applied from the magnet to the protrusion 77 may be large enough to damage the protrusion 77, causing a malfunction of the fan motor. Since the protrusion 77 is provided as a small protruding object having a peak point, the formability of the rotor may be degraded during its processing. After the processing, the protrusion 77 may be bent or deformed even by small impact. Accordingly, a fan motor, a BLDC motor, and a rotor for the BLDC motor, which can solve the above-described limitation, will be described below.

Figure 13:
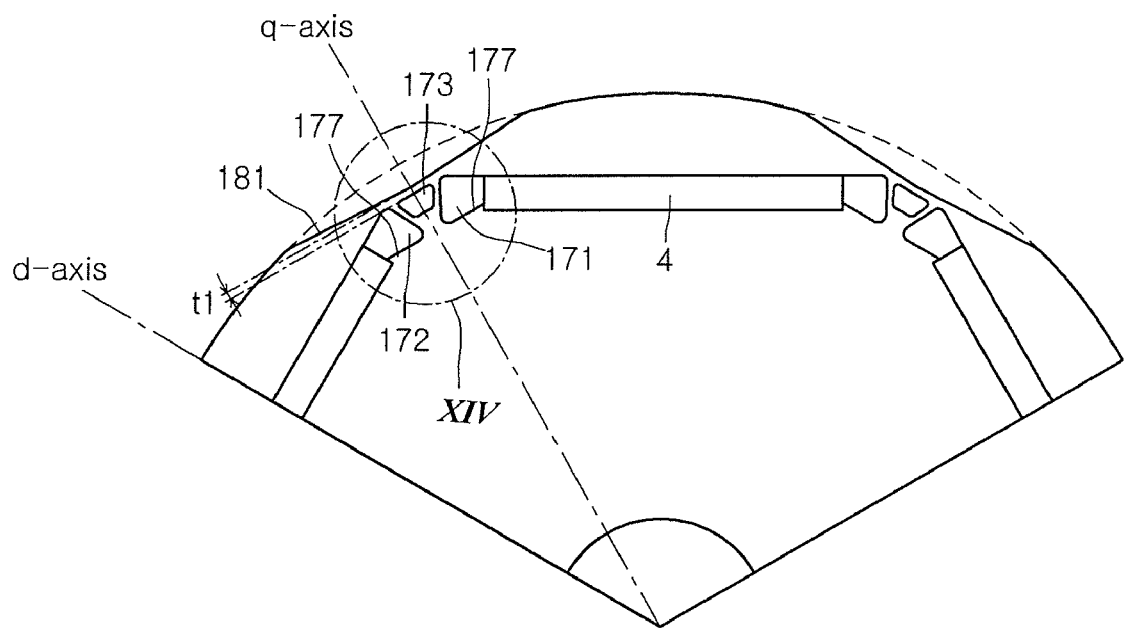
FIG. 13 is a partial plan view of a rotor for a BLDC motor according to another exemplary embodiment of the present invention.
Figure 14:
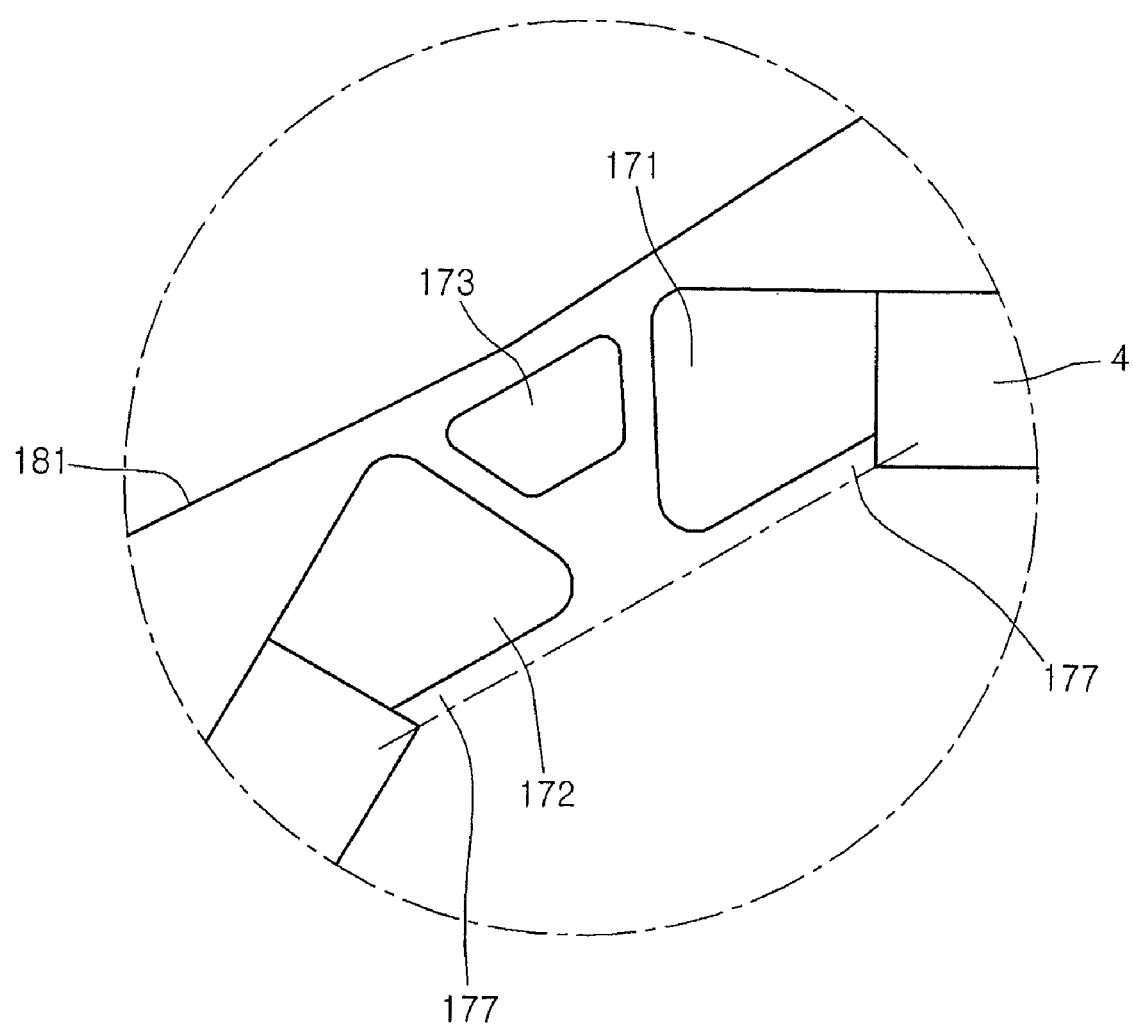
FIG. 14 is an enlarged view of a call-out XIV in FIG. 13.

FIG. 13 is a plan view of the rotor for the BLDC motor according to another exemplary embodiment, and FIG. 14 is an enlarged view of a region XIV in FIG. 13. Referring to FIGS. 13 and 14, a recessed portion 181, and third, fourth, fifth and sixth barriers 173, 174, 175 and 176 are identical to those described above. However, the shapes of a first barrier 171 and a second barrier 172 are different. In the first and second barriers 171 and 172, a side near to the center of the rotor serves as magnet fixing portions and linear support portions 177 are elongated in a straight line. In other words, the linear support portions 177 are provided in an elongated straight line at inner edges of the first and second barriers 171 and 172, so that the magnet 4 can be supported more stably. Even though the linear support portions 177 are pushed in a major edge direction, the magnet can be supported stably due to the linear elongated shape. Thus, the stable support of the magnet can be reinforced.

According to such a shape, since the linear support portion 177 is provided not as a protrusion shape but as an elongated straight line shape, the peak point disappears and thus the formation of the rotor is facilitated. Also, the linear support portion 177 will not be deformed later. In addition, the magnetic flux passing through a side near to the center of the rotor at the center position of the magnet end portion is a portion that does not greatly influence the variation of the leakage magnetic flux and the effective magnetic flux, and an amount of motor torque is not substantially varied. At least one of virtual lines connecting the end portions of a pair of adjacent magnets does not pass through the first and second barriers 171 and 172. For convenience, the fourth, fifth and sixth barriers are not shown.

In addition to the above-described embodiment, other embodiments can also be further provided.

For example, the fourth, fifth and sixth barriers may be removed in order to reinforce the stiffness of the rotor and facilitate the punching process of the rotor. As can be seen from the comparison of FIGS. 9 and 11, the effect of the present invention can be maintained. More barriers may be provided for increasing the effect.

Although it has been described that the recessed portions are provided as a straight edge, the present invention is not limited thereto. It is apparent that the reduction of the leakage magnetic flux and the reduction of the diameter D of the effective magnetic flux can be obtained even though the recessed portion is provided in a somewhat curved shape. However, as described above, the effect of the reduction in the diameter of the effective magnetic flux can be obtained when the recessed portion is provided with a straight edge.

According to the exemplary embodiments, the cogging torque is reduced and the motor is rotated in a low noise and low vibration state. Also, the torque is increased. Furthermore, since the low vibration and low noise state can be implemented by a simple shape improvement, the manufacturing costs of the motor can be reduced and the motor can be easily manufactured. Moreover, the processability of the rotor and the stability after the processing can be increased.

According to the exemplary embodiments, the rotor is rotated smoothly, and the torque is increased. Also, a separate current control for reducing vibration and noise is not required, and a soundproofing material and a vibration absorbing material are not required. Thus, the cost of materials is reduced and power consumption is reduced. Furthermore, since the processability of the rotor is improved, the yield of product is increased and the motor torque is maximized.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A brushless direct current (BLDC) motor, comprising:
a stator having a plurality of teeth formed at an inside thereof;
a plurality of coils, each of the plurality of coils being wound around a corresponding tooth of the stator;
a rotor located at the inside of the stator;
a plurality of magnets located at an edge portion of the rotor;
a plurality of magnet placement portions located on the rotor, each magnet placement portion having a first and second barrier formed at opposite ends of the magnet placement portion, the first barrier and second barrier of adjacent magnet placement portions being separated by a gap portion, each of the plurality of magnets being inserted into a corresponding magnet placement portion; and
at least one of the gap portions includes a third barrier located completely therein,
wherein at least one virtual line parallel to a center line connecting centers of end portions of at least one pair of adjacent magnets passes through at least the first, the second and the third barriers,
wherein at least one virtual line parallel to the center line connecting centers of end portions of the at least one pair of adjacent magnets passes through only the first and the second barriers, and
wherein the gap portion is defined by ends of the adjacent first and second barriers, a virtual line passing an inner corner of the adjacent first and second barriers, and a virtual line passing an outer corner of the adjacent first and second barriers.

2. The BLDC motor according to claim 1, wherein the third barrier is formed on a q-axis of a rotating coordinate system.

3. The BLDC motor according to claim 1, further comprising a plurality of recessed portions at an outer periphery of the rotor, each of the recessed portions being located adjacent a corresponding gap portion.

4. The BLDC motor according to claim 1, wherein widths of the first barrier and the second barrier between an outer edge and an inner edge increase from proximal ends of the first and second barriers adjacent the corresponding magnet to distal ends of the first and second barriers.

5. The BLDC motor according to claim 4, wherein outer edges of the first and second barrier extend substantially parallel to a longitudinal axis of the corresponding magnet.

6. The BLDC motor according to claim 4, wherein inner edges of the first and second barriers extend at an angle less than 45 degrees with respect to a longitudinal axis of the corresponding magnet.

7. The BLDC motor according to claim 1, further comprising a fourth barrier located between one of the first and second barriers and an outer periphery of the rotor.

8. The BLDC motor according to claim 7, further comprising a fifth barrier located between the other of the first and second barriers and the outer periphery of the rotor.

9. The BLDC motor according to claim 8, further comprising a sixth barrier located between the first and second barriers.

10. The BLDC motor according to claim 1, wherein at least one virtual straight line of a plurality of virtual straight lines passing through the first barrier and second barrier of adjacent magnet placement portions passes through a point forming the gap portion in a left and right direction.

11. The BLDC motor according to claim 1, wherein a geometrical center of the third barrier is placed outside a virtual line connecting the centers of end portions of a pair of adjacent magnets.

12. The BLDC motor according to claim 1, wherein at least one virtual line parallel to the center line connecting centers of end portions of at least one pair of adjacent magnets passes through the first, the second and the third barriers, when the at least one virtual line is outside of the center line, and
wherein at least one virtual line parallel to the center line connecting centers of end portions of the at least one pair of adjacent magnets passes through only the first and the second barriers, when the at least one virtual line is inside of the center line.

13. A rotor for a BLDC motor having a plurality of magnet placement portions for receiving magnets inserted therein, the rotor comprising:
a first barrier and a second barrier formed at opposite ends of each of the plurality of magnet placement portions, the first barrier and second barrier of adjacent magnet placement portions being separated by a gap portion;
at least one third barrier formed on a q-axis of a rotating coordinate system, the q-axis passing through the gap portion of adjacent magnet placement portions, the third barrier being located completely in the gap portion; and
a recessed portion formed at an outer periphery of the rotor adjacent a position where the third barrier is formed,
wherein at least one virtual line parallel to a center line connecting centers of end portions of at least one pair of adjacent magnets passes through at least the first, the second and the third barriers,
wherein at least one virtual line parallel to the center line connecting centers of end portions of the at least one pair of adjacent magnets passes through only the first and the second barriers, and
wherein the gap portion is defined by ends of the adjacent first and second barriers, a virtual line passing an inner corner of the adjacent first and second barriers, and a virtual line passing an outer corner of the adjacent first and second barriers.

14. The rotor according to claim 13, wherein b/a ranges from about 0.85 to 0.89, where a is an angle of one pole of the rotor, and b is an angle occupied at one pole by the magnet and the first and second barriers.

15. The rotor according to claim 13, wherein d/e ranges from about 0.16 to 0.20, where d is a distance from the outer periphery of the rotor to the center of the magnet on a d-axis of a rotating coordinate system, and e is a distance from the outer periphery of the rotor to the center of the rotor on the d-axis of the rotating coordinate system.

16. The rotor according to claim 13, wherein f/e ranges from about 0.040 to 0.051, where e is a distance from the outer periphery of the rotor to the center of the rotor on a d-axis of a rotating coordinate system, and f is a maximum depth of the recessed portion on a q-axis of the rotating coordinate system.

17. The rotor according to claim 13, wherein $a*d/e*b$ ranges from about 0.1 to 0.5, where a is an angle of one pole of the rotor, b is an angle occupied at one pole by the magnet and the first and second barriers, d is a distance from the outer periphery of the rotor to the center of the magnet on a d-axis of a rotating coordinate system, and e is a distance from the outer periphery of the rotor to the center of the rotor on the d-axis of the rotating coordinate system.

18. The rotor according to claim 13, wherein $(d*f/(e^2))$ *1000 ranges from about 5 to 15, where d is a distance from the outer periphery of the rotor to the center of the magnet on a d-axis of a rotating coordinate system, e is a distance from the outer periphery of the rotor to the center of the rotor on a d-axis of a rotating coordinate system, and f is a maximum depth of the recessed portion on a q-axis of the rotating coordinate system.

19. The rotor according to claim 13, wherein a deepest recessed portion of the recessed portion is located adjacent the third barrier, and the edge of the recessed portion has a straight line shape.

20. The rotor according to claim 13, further comprising protrusions formed on opposite end portions of the magnet placement portion to support the magnet.

21. The rotor according to claim 13, further comprising linear support portions formed on opposite end portions of the magnet placement portion to support the magnet, wherein due to the linear support portions, at least one virtual line of a plurality of virtual lines connecting end portions of adjacent magnet placement portions do not pass through the first, second, and third barriers.

22. The rotor according to claim 13, wherein at least one virtual line parallel to a center line connecting centers of end portions of at least one pair of adjacent magnets passes through at least three barriers, when the at least one virtual line is outside of the center line.

23. The BLDC motor according to claim 1, wherein the barrier comprises a removed portion of the plate member.

24. The BLDC according to claim 1, wherein the barrier includes a non-magnetic body located in the removed portion.

* * * * *